United States Patent
Thomasberg et al.

(10) Patent No.: US 12,328,554 B2
(45) Date of Patent: Jun. 10, 2025

(54) METHOD FOR IMPROVING SOUND QUALITY OF SOUND REPRODUCTIONS OR SOUND RECORDINGS IN A ROOM

(71) Applicant: BANG & OLUFSEN A/S, Struer (DK)

(72) Inventors: Lasse Zinck Thomasberg, Viborg (DK); Jakob Dyreby, Struer (DK)

(73) Assignee: BANG & OLUFSEN A/S, Struer (DK)

( * ) Notice: Subject to any disclaimer, the term of this patent is extended or adjusted under 35 U.S.C. 154(b) by 343 days.

(21) Appl. No.: 17/936,255

(22) Filed: Sep. 28, 2022

(65) Prior Publication Data
US 2023/0096292 A1  Mar. 30, 2023

(30) Foreign Application Priority Data
Sep. 29, 2021  (DK) ............................ PA 2021 00927

(51) Int. Cl.
  H04R 29/00  (2006.01)
  G01N 29/12  (2006.01)
  H04S 7/00  (2006.01)

(52) U.S. Cl.
  CPC ........... H04R 29/001 (2013.01); G01N 29/12 (2013.01); H04S 7/305 (2013.01); G01N 2291/014 (2013.01)

(58) Field of Classification Search
  CPC ...... H04R 29/001; H04S 7/305; G01N 29/12; G01N 2291/014
  USPC ........... 381/59, 58, 56, 61, 64, 66, 352, 345, 381/71.8, 71.4, 71.14, 150, 337; 324/312, 324/316, 315, 636, 633, 600, 76.21, 76.1, 324/76.11, 300
  See application file for complete search history.

(56) References Cited

U.S. PATENT DOCUMENTS

2003/0099365 A1* 5/2003 Karjalainen ............ H04S 7/302
                                                381/61
2020/0053503 A1* 2/2020 Butera, III ........... H04R 1/1008

OTHER PUBLICATIONS

Extended European Search Report for EP Patent Application No. 21020653.8, dated Jun. 9, 2022, 8 pages.
(Continued)

Primary Examiner — Vivian C Chin
Assistant Examiner — Con P Tran
(74) Attorney, Agent, or Firm — Crowell & Moring LLP; Thomas E. Williams (57) ABSTRACT

The invention relates to a method for improving the sound quality of a sound reproduction or recording in a room, the method comprising the steps of measuring an impulse response that comprises the linear response of the room; performing a time domain analysis to determine the resonances of the room and for a chosen group of room resonances determining a corresponding group of filters that, when inserted in a sound reproduction or recording chain in said room will counteract the unwanted effect of said chosen group of room resonances on the sound quality of sound reproduction or recording made in the room. The invention further relates to a device designed to implement the method according to the invention and to the use of a measure of amplitude decay as a function of frequency of a measured impulse response of a sound reproduction or recording system in a room to determine one or more resonance frequencies, the total or partial compensation of which will improve the sound quality of sound reproductions or recordings made in the room.

17 Claims, 4 Drawing Sheets

(56) References Cited

OTHER PUBLICATIONS

Jakob Dyreby et al, "Audio Engineering Society Convention Paper Equalization of loudspeaker resonances using second-order filters based on spatially distributed impulse response measurements", 2007, 14 pages. Retrieved from the Internet: http://www.aes.org/e-lib/inst/download.cfm/14263.pdf?ID=14263.
Harley, Robert. "DSP Room Correction." Complete Guide to High-End Audio, Acapella Publishing, 2015, pp. 400-402.

* cited by examiner

METHOD FOR IMPROVING SOUND QUALITY OF SOUND REPRODUCTIONS OR SOUND RECORDINGS IN A ROOM

CROSS-REFERENCE TO RELATED APPLICATIONS

This application claims priority to Danish Patent Application No. PA 2021 00927, filed on Sep. 29, 2021, which is incorporated by reference herein in its entirety.

TECHNICAL FIELD

The present invention relates generally to the field of sound reproduction and recording in rooms and more specifically to means for improving the sound quality of sound reproductions or recordings made in rooms. Still more specifically, the present invention relates to a method and device for compensation of the detrimental effect of room resonances on sound quality of sound reproductions or recordings in rooms.

BACKGROUND OF THE INVENTION

A number of approaches to improve the sound quality of a loudspeaker in a specific listening room have been described in the art. Many of these prior art approaches are based on the measurement of sound pressure level (SPL) at the listening position in a room, in which one or more loudspeakers are placed. If a loudspeaker, that has a substantially flat (or other desired) frequency response when measured in an anechoic room, is placed in a real (non-ideal) room, the acoustic characteristics of the room, such as room modes (room resonances) and reverberation time will inevitably change the frequency response of the loudspeaker measured in said real room and normally in an undesirable manner. For example, sound radiated from the loudspeaker may excite one or more of the room modes depending on the location of the loudspeaker in the room.

One drawback of former approaches is that they only check single frequencies at any given time, e.g., with frequency specific bursts, or do not focus on specific frequencies, e.g., just use predefined corrections based on the loudspeaker's position relative to the room's walls, e.g. using a "Free, Wall, Corner"-switch to select different correction filters. Furthermore, most approaches which attenuate room modes use a microphone measurement in the listening position. Such approaches do however normally not lead to the best possible increase of overall sound quality and even though they may provide acceptable results at a specific listening position, they may well lead to a deterioration of sound quality at other locations in the room, where listeners may also be located.

Basically, the same problematics are encountered when a microphone recording of for instance a person's voice is made at a given position in a room. The voice will in this case (just as the loudspeaker described above) excite room modes (room resonances) and lead to a coloration of the sound of the voice that in most cases will be undesirable.

There is hence a need for a method and corresponding device or system that is capable of markedly increasing the sound quality of either sound radiated from a loudspeaker or of sound picked up by a microphone in a room that is acoustically characterised by the presence of room modes. Such modes are especially pronounced at low frequencies, for instance for frequencies in the 20 to 200 Hz region, although this depends on the size and geometry of the room.

SUMMARY OF THE INVENTION

It is an object of the present invention to increase subjective sound quality by reducing the audibility of room modes (room resonances) that are excited by one or more loudspeakers in the room or by human voice or other sound generating sources in the room.

It is a further object of the invention to increase subjective sound quality based on measurements performed by only a single microphone that may not be positioned at a preferred listening position or a preferred recording position in a room.

It is noted that although the invention can increase subjective sound quality by using only a single microphone, it need not be limited to only a single microphone. Applying only a single microphone may be desired if the microphone is provided on a product, such as a loudspeaker, for instance to reduce costs. An advantage of using more than one microphone is that a better estimate of how a given room affects the subjective sound quality can be obtained.

According to one aspect of the present invention there is provided a method to compensate for poor room acoustics, where room modes resonate at specific frequencies and thereby degrade the sound quality of one or more loudspeakers playing audio content in the room or degrade the sound quality of sound picked up by one or more microphones in the room.

According to the present invention, only one microphone measurement is required, and this measurement focuses on specific problematic frequencies of the room (such as insufficiently damped room modes) to enhance the subjective sound quality.

The present invention works with microphone measurements not necessarily performed in the listening position, e.g. by using a microphone integrated into a loudspeaker enclosure. This has the advantage that both the loudspeaker sound quality and the microphone sound quality can be improved, the latter in case the microphone signal is used for recording, control, communication or other purposes as well as for room measurement purposes.

A basic feature of the present invention is to use the impulse response of a loudspeaker in a room to analyse for resonating frequencies by analysing frequencies after a given number of periods of the test frequency or after a certain time interval long enough to allow the room to resonate.

The goal of the method according to the invention is to generate a set of filters to be inserted in the loudspeaker's signal chain or in the microphone's signal chain (such filters could for instance be a number of pairs of dip and boost filters, but the present invention is not limited to the use of these specific kinds of filters) that reduce a room resonance's effect on the subjective sound quality of audio material played back through the one or more loudspeakers or on the subjective sound quality of sound picked up by the one or more microphones. If dip and boost filters are used, it is not a necessary requirement that pairs of such filters be used. The effect of the dip filters is to reduce the resonances, whereas the effect of the boost filters is to restore the tonal balance by adding the energy that was removed by the dip filters. Hence, in some embodiments of the present invention, pairs of corresponding dip and boost filters are used, whereas in other embodiments the number of dip and boost filters may differ, and in some embodiments, boost filters may not be used at all.

A special purpose of the present invention is to enhance the subjective sound experience in rooms that are poorly acoustically treated in the lower frequency range. This is especially true on transient sounds that encompass frequencies where said room has room modes that resonate. The improvement can be achieved both in the sound played by one or more loudspeakers and in the sound picked up by a microphone used for recording, control, communication or other purposes. As this system also works with products that only have internal microphones, the commercial target is quite wide.

The method according to the invention can for instance be implemented on a suitable online platform and thereby provided as an OTA (over the air) software update of existing products in the field via this platform.

In a practical implementation of the method according to the invention, the different parameters, such as the number of filters, the kinds of filters, the choice of transition frequency $F_T$ (to be described in the following) etc. are predefined for instance when the method is implemented in a given product. The choice of parameters may thus be different for different practical implementations, but available by the algorithm executing the method after the method is implemented in a given product. The method can thus be rum automatically by the given product.

For instance, the number of filters is predefined, for instance based on the computational capacity of the digital signal processing means available in the given product. Whether or not the dip and boost filter pairs described in the following are to be used in the algorithm or if a different number of dip and boost filters are to be used is also predefined. It may also be possible to specify that only dip filters are to be used or it may be predefined that other kinds of filters are used instead of dip and boost filters.

Further, it may also be predefined to allocate a certain number X of filters for frequencies below the transition frequency $F_T$ and a certain number Y of filters above $F_T$ or if no transition frequency is used at all. It may thus for instance be possible to predefine that below $F_T$ all resonance peaks are compensated for, whereas above $F_T$ only some of the resonance peaks, for instance those of largest magnitude are chosen for compensation taking account of the maximum number of filters available in the specific implementation.

According to a first aspect of the present invention there is provided a method for improving the sound quality of a sound reproduction or recording in a room, the method comprising the steps of:
  measuring an impulse response that comprises the linear response of the room;
  performing a time domain analysis to determine the resonances of the room;
  for a group of room resonances selected based on predefined criteria determining a corresponding group of filters that, when inserted in a sound reproduction or recording chain in said room will counteract the unwanted effect of said group of room resonances on the sound quality of sound reproduction or recording made in the room.

In an embodiment of the first aspect, said impulse response further comprises the linear response of transducers, such as loudspeaker(s) and/or microphone(s), used to measure the impulse response.

In an embodiment of the first aspect, the method comprises the steps of:
  obtaining a measure of amplitude decay as a function of frequency of the measured impulse response;
  determining the room resonances by performing a peak detection analysis or a determination of local maxima on the measure of amplitude decay as a function of frequency;
  choosing specific room resonances based on predefined criteria, which room resonances are characterized by respective resonance frequencies $F_i$ that are to be compensated for in order to improve said sound quality;
  determining the bandwidth $Q_i$ and gain $G_i$ of each of said room resonances;
  based on the respective parameters $F_i$, $Q_i$, and $G_i$ determining a compensating signal processing means, such as a filter bank or an equalizer, that when inserted into the sound reproduction or recording chain substantially counteracts the unwanted effect of the chosen room resonances on the sound quality.

In an embodiment of the first aspect, the step of obtaining a measure of amplitude decay as a function of frequency is started at a specified time after the start of the measured impulse response.

In an embodiment of the first aspect, the step of obtaining a measure of amplitude decay as a function of frequency is started at a multiple specified times after the start of the measured impulse response.

In an embodiment of the first aspect, the measure of amplitude decay as a function of frequency is obtained by periodical cumulative decay spectrum (PODS) analysis of the measured impulse response. Other time domain analyses could however also be used, such as waterfall analysis.

In an embodiment of the first aspect, the compensating signal processing means comprises at least one dip filter and at least one boost filter, each characterized by a respective center frequency $F_j$, bandwidth $Q_j$ and gain $G_j$, which center frequency $F_j$, bandwidth $Q_j$ and gain $G_j$ according to the method are adjusted based on said parameters $F_i$, $Q_i$, and $G_i$, determined at said chosen room resonances.

In an embodiment of the first aspect, the method further comprising the steps of:
  selecting, based on predefined parameters a transition frequency $F_T$;
  below $F_T$ using a first predetermined Q-value for each dip filter and a second predetermined Q-value for each boost filter;
  above $F_T$ using a third predetermined Q-value for each dip filter and a fourth predetermined Q-value for each boost filter.

In an embodiment of the first aspect, the specific room resonances that shall be compensated by the method are chosen based on the determined gain $G_i$, of the determined room resonances, such that a number M of specific room resonances having the largest gain values are chosen.

In an embodiment of the first aspect, the compensating signal processing means comprises a total number of N filters or corresponding pairs of filters, such as corresponding dip and boost filters.

In an embodiment of the first aspect, there is provided a number X of filters or filter pairs below $F_T$ and a number Y of filters or filter pairs above $F_T$.

In an embodiment of the first aspect, below the transition frequency $F_T$ all determined resonances are compensated and above $F_T$ as many of the determined resonances as possible are compensated by the remaining filters.

In an embodiment of the first aspect, below the transition frequency $F_T$ all determined resonances are compensated and above $F_T$ as many of the determined resonances as possible are compensated by the Y filters available, thereby giving control over how many resonances are compensated above $F_T$.

In an embodiment of the first aspect, below $F_T$ as many of the determined resonances as possible are compensated by the X filters available and above $F_T$ as many of the determined resonances as possible are compensated by the Y filters available, thereby giving the best possible control over how many resonances are compensated both below and above $F_T$.

In an embodiment of the first aspect, the gain $G_j$ of the respective dip filters is determined based on maximum values of the resulting difference curve in a small frequency area around the chosen room resonances and a set of two predetermined constants A and B, where constant A is used below said transition frequency $F_T$ and constant B is used above said transition frequency $F_T$.

In an embodiment of the first aspect, one boost filter is used for each dip filter, where the bandwidth of each respective boost filter is wider than the bandwidth of the corresponding dip filter.

In an embodiment of the first aspect, the gain of the respective boost filters is determined by multiplying a respective constant based on the Q value of the associated dip filter, with the gain of the associated dip filter, where the respective constants are predetermined such that the respective resulting boost filter approximately adds the energy removed by the respective dip filter back into the signal processed by the combination of dip and boost filters.

According to a second aspect of the present invention there is provided a device for improving the sound quality of a sound reproduction or recording in a room, the device comprising filter means configured to implement the method according to the first aspect of the invention, such that introduction of the device in the signal chain between an audio signal source and a loudspeaker or between a microphone and a sound recording device substantially compensates for an unwanted effect of the resonances in the room on the sound quality.

According to the second aspect, the filter means comprise one or more dip filters, the parameters of which are determined based on the determined resonances of the room.

According to the second aspect, the filter means comprise one or more boost filters configured to reduce an unwanted effect of said dip filters on the sound quality.

According to a third aspect, the present invention relates to the use of a measure of amplitude decay as a function of frequency of a measured impulse response of a sound reproduction or recording system in a room to determine one or more resonance frequencies, the total or partial compensation of which will improve sound quality of sound reproductions or recordings made in the room.

In an embodiment of the third aspect, the compensation is carried out by the method according the first aspect or by the device according to the second aspect.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein.

DETAILED DESCRIPTION OF THE INVENTION

In the following a detailed description of an example embodiment of the method according to the invention is given. It is, however understood that the principles of the invention could be embodied in other ways.

Figure 1:
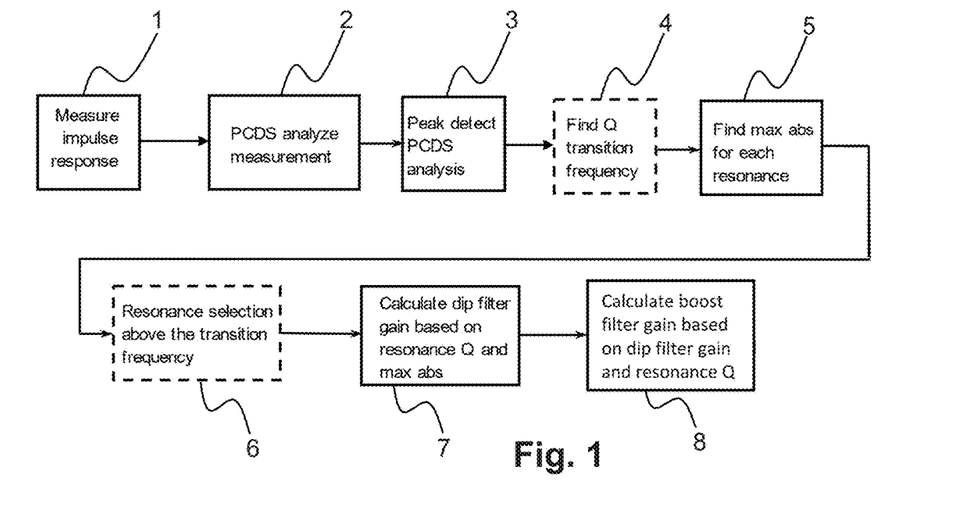
FIG. 1 shows a flow diagram of an embodiment of the method according to the invention that detects resonances and calculates filter coefficients.
Figure 4:
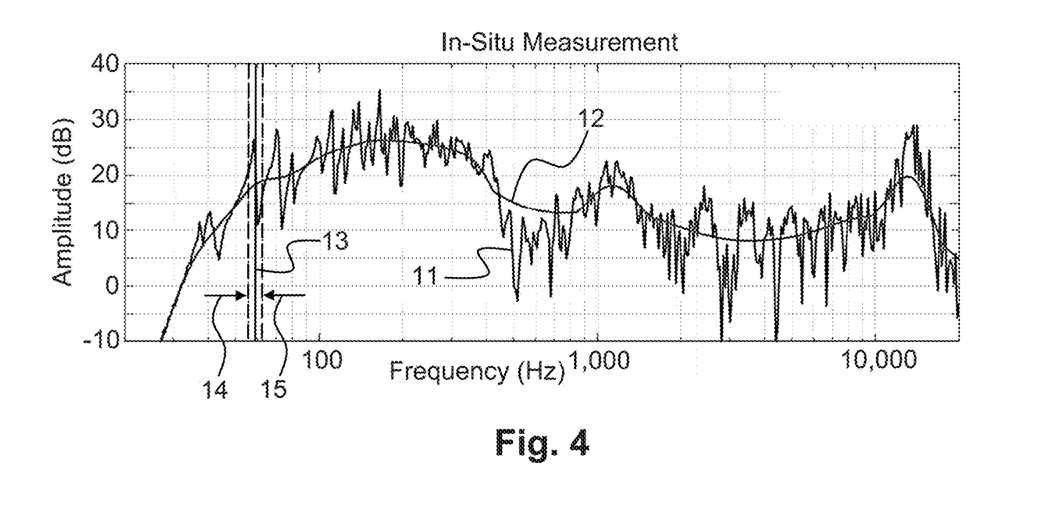
FIG. 4 is an example measurement with the smoothed equivalent being analyzed around each detected resonance.

With reference to FIG. 1 there is shown a flow diagram of the various steps performed in an exemplary embodiment of the invention. These steps are described in detail in the following sections of the detailed description. The blocks 1, 2, 3, 5, 7 and 8 delimited by an unbroken line constitute necessary steps of the method according to the invention, whereas the blocks 4 and 6 delimited by a broken line constitute options that can be either left out (giving reduced complexity) or incorporated (giving higher complexity) in order to reduce the complexity and/or computational requirements of the inventive method. The functions of these blocks will be described in detail in subsequent paragraphs. The method starts with measuring the impulse response 1 of for instance a loudspeaker placed in a room and the impulse response is then analyzed in the PODS analysis block 2. It is noted that in other embodiments other kinds of time domain analyses may be used). Based on the spectrum determined in block 2, a peak detection analysis is then performed in block 3. In block 5, for each of the peaks determined in block 3 the maximum absolute value and the corresponding Q-value are determined as illustrated in FIG. 4. With reference to the detailed description of the various functional blocks given below, it is noted that the Q-values corresponding to the individual peaks may already have been chosen for frequencies below and above the Q transition frequency $F_T$ that optionally is determined in block 4.

Figure 5:
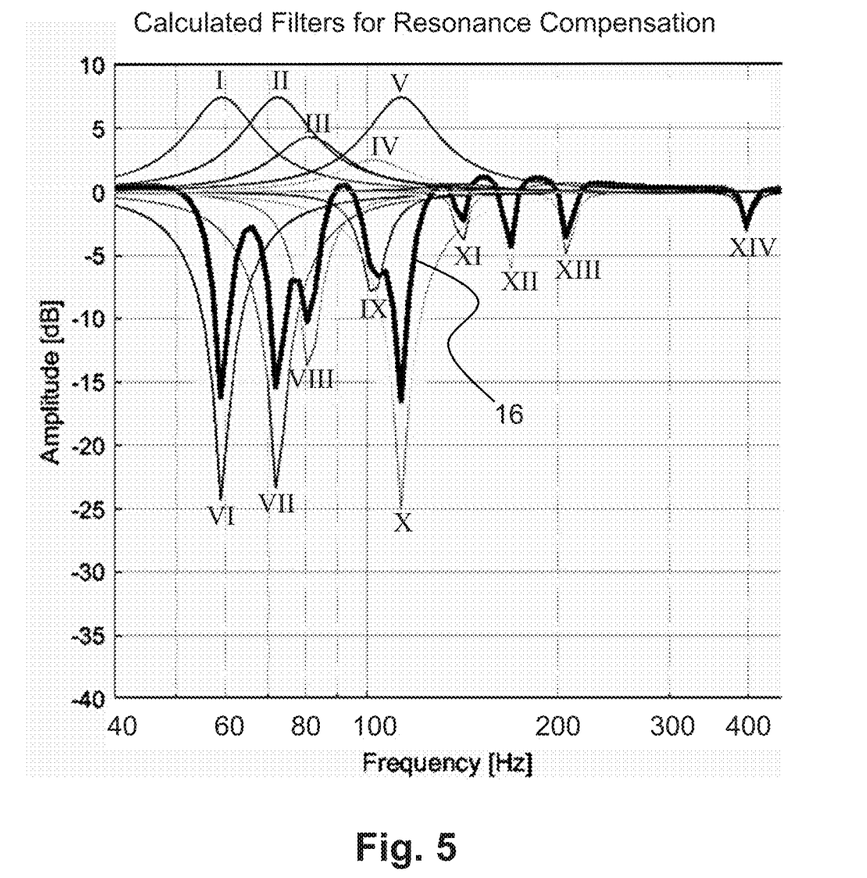
FIG. 5 shows the resulting dip and boost filters that are implemented into the DSP signal chain for instance providing a signal to the input terminals of a loudspeaker.

As the final steps of the embodiment of the method according to the invention illustrated in FIG. 1, in functional blocks 7 and 8, respective dip filters and boost filters for each resonance found in the analysis are now determined. An illustrative example is shown in FIG. 5 and will be described in the following.

The determined filters (the calculated filter coefficients) can then be implemented and inserted into the sound reproduction or recording chain in order to effectively compensate for the undesired effects of the room resonances on the sound quality.

In the following a detailed description of the various functional blocks (method steps) of the method according to the invention outlined in FIG. 1 is presented. It should however be noted that the functions actually performed in the various functional blocks may be carried out in different manners than actually described, and that the scope of protection of the present invention is solely defined by the claims.

Impulse Response Measurement

Taking the compensation of room resonances on the frequency response of a loudspeaker placed in the room as a non-limiting example of an embodiment of the method according to the present invention, as a first step the impulse response between loudspeaker input and at least one microphone output is measured (block 1 in FIG. 1). The loudspeaker should be at the desired position in the room. A method for measuring the impulse response comprises driving the loudspeaker with a sine sweep over the audio frequency range and performing a Fourier Transformation on both the input sweep and on the output sweep, measured with the microphone. Dividing the two frequency spectra will yield the frequency response of the loudspeaker in its current position in the room. Performing an inverse Fourier Transformation will yield the impulse response (in the time domain), which will include both the effect of the loudspeaker and the room effects. The impulse response should be sufficiently long, such that the room response is described in sufficient detail. Often, the impulse response is windowed in order to remove the effect on the impulse response of the boundaries of the room, such as sound reflection from the walls or ceiling of the room. Applying a window function to the measured impulse response leads to a shortening of the impulse response. In the context of the present invention, the impulse response can be shortened only to a certain degree, but it must still encompass the reflections and reverberation of the room in which it is measured. Usually, the room modes are the part of the impulse response of the room that have the longest decay. Therefore, it is important to include at least substantially the complete tail of the impulse response.

Peak Detection Based on Pods Analysis

According to the invention, a Periodical Cumulative Decay Spectrum (PODS) analysis of the measured impulse response is performed (block 2 in FIG. 1). This type of analysis cumulates the energy for a single decaying frequency starting from a specified period, where the period means a sine tone period, for the analysed frequency resulting in different start times (seconds), for the cumulative energy sum, of the impulse response. In one embodiment of the invention the analysis is only carried out for a certain number of periods for each frequency to be analysed, but in other embodiments of the invention the analysis is not limited to a single period. Provided that enough computational power is available to carry out the method, it is possible to calculate an exact Q value for a given resonance, which will make it possible to calculate the optimal filter for each specific resonance.

Figure 2:
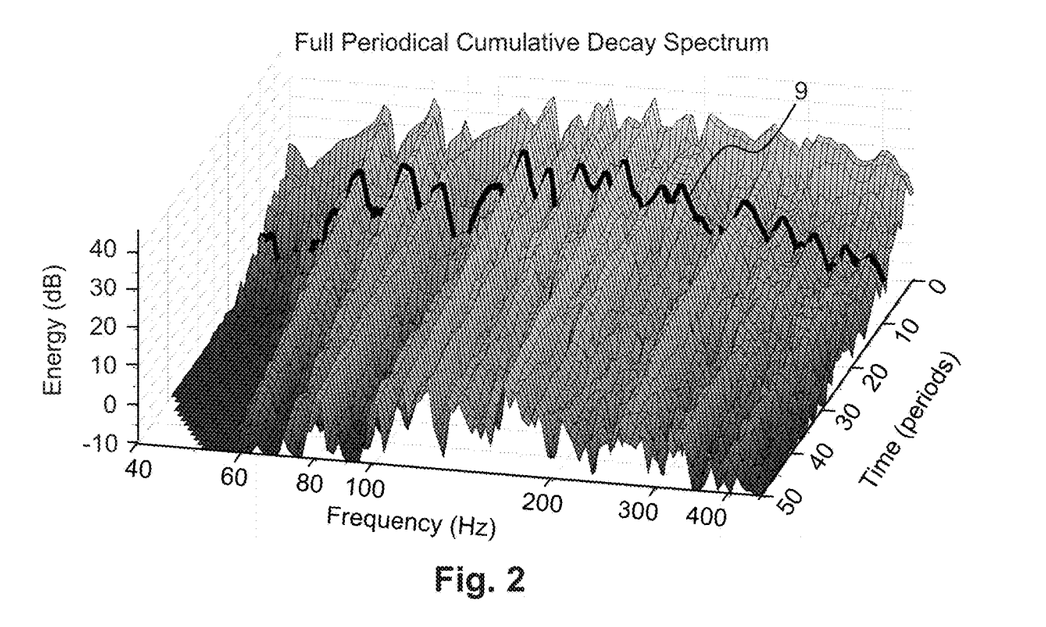
FIG. 2 shows an example of a periodical cumulative decay spectrum obtained as a step of the method according to the invention. The plot illustrates an impulse response of a loudspeaker in a room and how the acoustic energy decays over periods. The highlighted heavy line is an example of what is used in FIG. 3 for further calculations.

With reference to FIG. 2, a PODS for multiple periods and frequencies is illustrated as an example of calculations carried out by means of the equation given below. The illustration is somewhat similar to a waterfall plot in that it illustrates the energy at a given frequency at a given period (usually waterfall plots illustrate this for time and not periods). In this way the illustration shows how the energy for a given frequency decays over periods (or time and not necessarily whole periods). The plot shown in FIG. 2 is obtained from the following equation:

$$PCDS(p, f) = \int_{\frac{p}{f}}^{\infty} h(t)e^{-j2\pi ft} dt$$

Where:

$$p = \text{period}[.]$$
$$f = \text{frequency}\left[\frac{1}{s}\right]$$
$$t = \text{time}[s]$$
$$h = \text{impulse response}[.]$$

Figure 3:
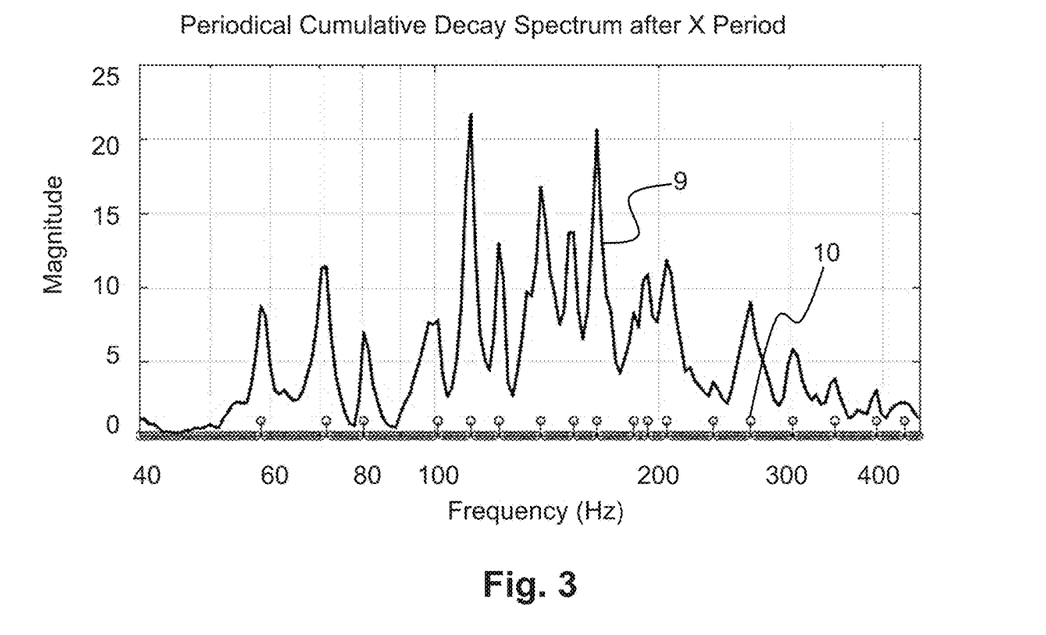
FIG. 3 shows an example of a PODS analysis for one period of the spectrum shown in FIG. 2, where the peaks have been marked as room resonances.

According to the invention, the result of the PODS analysis is then analysed, in magnitude, in order to determine peaks (block 3 in FIG. 1). FIG. 3 shows an example of a PODS analysis for one period of the spectrum shown in FIG. 2 as indicated by the heavy line 9 in FIGS. 2 and 3. The peaks are then marked as room resonances. An example of this is shown in FIG. 3 where the found resonance frequencies are marked on the frequency axis as indicated by reference numeral 10.

To use the resonance detection method according to the invention in a practical implementation, some implementation requirements or restrictions may be preferable, although it is emphasized that the need for such requirements/restrictions depend on the specific implementation of the method and the computational capacity available. First, it must be decided how many filters are feasible to be implemented in practice. In the example shown in FIG. 5 one boost filter and one dip filter is implemented for each resonance frequency found below a given upper frequency that in the example shown in FIG. 5 is 400 Hz. Each of these filters needs the specification of a centre frequency $F_c$, a bandwidth Q and a gain G. Since the room resonates at different frequencies, each with different Q, each of the filters ideally would need a different Q value and gain. Determining all of these filter parameters individually for each of the found resonance frequencies is very computationally intensive and sensitive to noisy measurements. Instead, according to an example embodiment of the invention two Q value pairs (one Q value for the respective dip filter and one for the respective boost filter) are predefined and used, one Q value pair for all boost and dip filters at resonance frequencies below a certain transition frequency $F_T$ and one Q value pair for all boost and dip filters at resonance frequencies above that transition frequency $F_T$. This simplification drastically reduces computational requirements and still emulates to a satisfactory degree the resonance Q change in a room as a function of the frequency. It is however to be noted that this simplification is not necessary for the system to work, and in an embodiment of the invention, the Q value, or an approximation hereof, is calculated for each resonance frequency.

It is noted that in other embodiments of the invention, more than two Q values are determined, for instance one below a first transition frequency $F_{T1}$ one between the first transition frequency $F_{T1}$ and a second transition frequency $F_{T2}$ and one above the second transition frequency $F_{T2}$.

Q Transition Frequency Determination

As mentioned in the previous section, two Q value pairs are predefined in the example embodiment of the invention. To transition between these predefined Q value pairs a transition frequency $F_T$ is found based on the measured impulse response (block 4 in FIG. 1). This simplification is made for implementation of the algorithm and is not of importance for the essence of the invention.

Resonance Frequencies Determination

After finding (or predefining) the Q value for each dip filter, individual gains for each of the respective filters are calculated. According to the example embodiment of the invention, the absolute value of the difference between a smoothed version 12 of the measurement curve and the raw measurement curve 11 is calculated (block 5 in FIG. 1). Then, the maximum value of the resulting difference curve in a small frequency area 14, 15 around each resonance 13 is found. A graphical example of this can be seen in FIG. 4 in which a series of maximum values equal to the number of resonances are available.

Resonance Selection

In an embodiment of the invention, a potentially undesirable side effect of the method according to the invention is overcompensation. Thus, in the frequency range above the transition frequency, removing all of the resonances can cause an undesirable colouration of the sound leading to reduced subjective sound quality. In order to overcome this problem, according to an embodiment of the invention, only Y filters above the transition frequency are implemented (Y being a predefined number of filters) (block 6 in FIG. 1). The Y filters to be used are chosen based on the highest maximum values found such that the resonances with the biggest impact are affected. The frequencies in the new list of Y selected resonances are used as the centre frequencies ($F_c$) for the Y filters. In this process, only resonances up to a certain frequency are considered, e.g. 400 Hz or 500 Hz or alike.

Dip Filter Gain Calculation

When the resonances are selected, the dip filter gains are calculated (block 7 in FIG. 1). The calculations are based on the maximum values around the resonances calculated earlier, and a set of two constants A and B. The A constant is used below the transition frequency $F_T$ and the B constant is used above the transition frequency $F_T$. The constants are mapped to the corresponding Q value, which means that if the implementation comprises more Q values, more constants are needed. The constants are predetermined (for instance by experiments) and can vary based on the loudspeaker to microphone setup.

Boost Filter Gain Calculation

A set of boost filters are implemented to add the energy removed by the dip filters back to a frequency area around each of the dip filters, one boost filter is implemented for each dip filter. This is done to maintain the timbral balance. The boost filters have a wider bandwidth than the dip filters to spread out the energy away from the resonance frequency.

Figure 6:
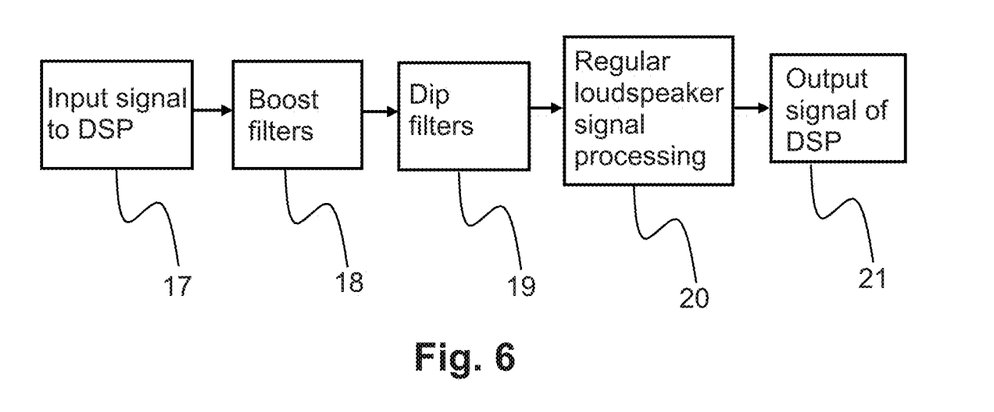
FIG. 6 shows an example of how the filters can be implemented into the DSP signal chain.

All the boost filters are implemented with a fixed Q. However, this is done to optimize the implementation. The Q values do not necessarily have to be limited to a fixed value. The boost filters' gain is calculated (block 8 in FIG. 1) by multiplying a constant C or D, based on the Q value of the associated dip filter, with the associated dip filters' gain. The C and D constants are predetermined such that the resulting filter approximately adds the removed energy back into the signal thereby maintaining substantially the same energy in the transfer function of the filter. This system is limited to two constants, because the dip filters are limited to two Q values, but this limitation is not necessary. It would be possible to implement an algorithmically calculated constant. The filters calculated through this example are depicted in FIG. 5. In FIG. 6 an example of how the filters can be implemented into the DSP signal chain of the loudspeaker or the microphone can be found.

Complete Signal Chain

With reference to FIG. 5 there is shown an example of calculated filters for resonance compensation. The filters comprise a number of dip filters indicated by VI to XIV and boost filters I to V corresponding to the dip filters VI to X. Additional boost filters may or may not be implemented corresponding to the dip filters XI to XIV. The resulting filter characteristic is shown by the heavy line indicated by reference numeral 16. It is however understood that the resulting filter characteristic 16 could have been obtained by other means than the dip and boost filters applied in FIG. 5.

With reference to FIG. 6 there is shown an example of how the filters can be implemented into a DSP signal chain in order to compensate for room resonances in the case of sound reproduction from a loudspeaker located at a specific position in the room. In block 17 an input signal is applied to the signal chain and the compensation of the undesired effect of room resonances is carried out in the boost filters 18 (some or all of these filters may however be left out) and the dip filters 19. In block 20, regular loudspeaker signal processing, such as frequency response shaping, is carried out and the result of the total signal processing is outputted in block 21 and then provided to the loudspeaker (not shown).

Figure 7:
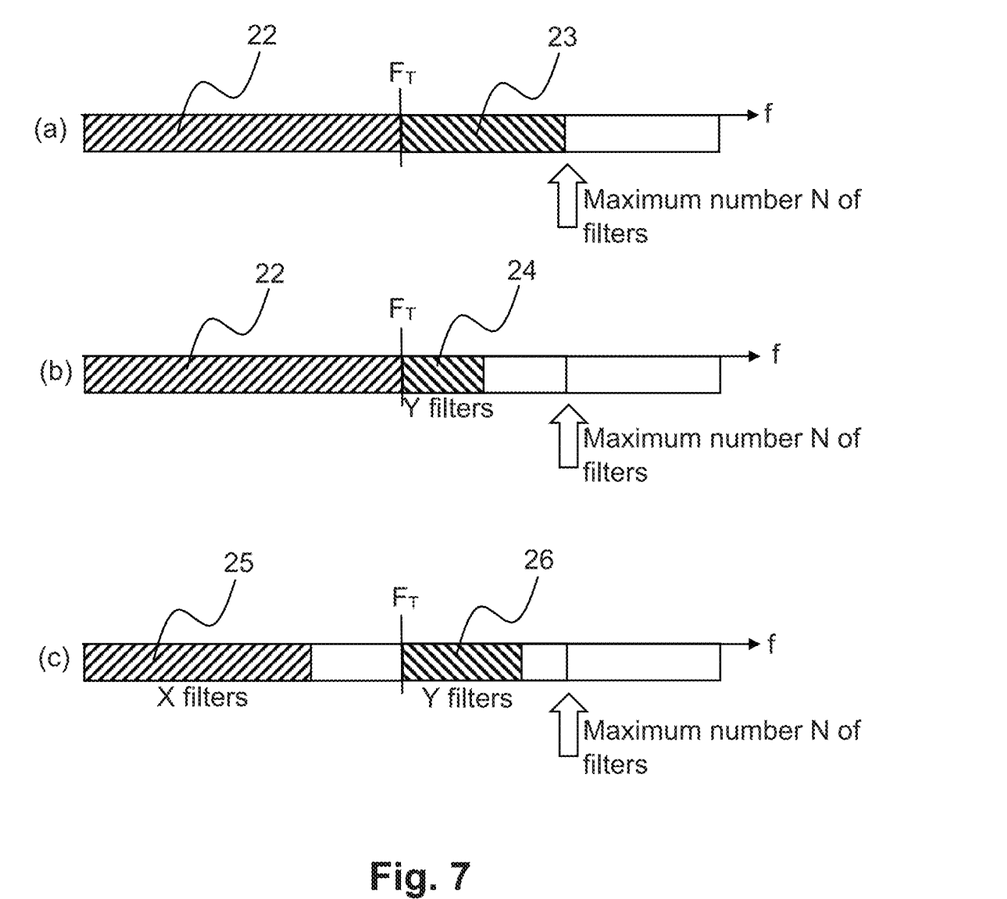
FIG. 7 shows a schematic illustration of different filter allocation strategies that can be applied according to the method of the invention for a given maximum number N of filters or filter pairs in a specific implementation of the method.

With reference to FIG. 7 there is shown a schematic illustration of different filter allocation strategies (a), (b) and (c) that can be applied according to the method of the invention for a given maximum number N of available filters or pair of filters in a specific implementation of the method.

It is in the following three filter allocation strategies shown in FIG. 7 assumed that there are a total number of N filters or pairs of filters, such as dip and boost filters, available in the specific implementation out of which a maximum number X filters or pairs of filters is defined to be used below $F_T$ and a maximum number Y filters or pairs of filters is defined to be used above $F_T$, such that X+Y≤N.

a. Below the transition frequency $F_T$ all determined resonances (22) are compensated and above $F_T$ as many determined resonances as possible (23) are compensated by the remaining filters or pairs of filters. In this case, all N available filters or pairs of filters will be used.

b. Below the transition frequency $F_T$ all determined resonances (22) are compensated and above $F_T$ as many determined resonances as possible (24) are compensated by the Y filters or pairs of filters, thereby giving control over how many determined resonances (24) are compensated above $F_T$. In this case, a total number of filters equal to or smaller than N will be used.

c. Below $F_T$ as many determined resonances as possible (25) are compensated by the X filters or pairs of filters and above $F_T$ as many determined resonances as possible (26) are compensated by the Y filters or pairs of filters, thereby giving the best possible control over how many determined resonances are compensated both below and above $F_T$. In this case, a total number of filters equal to X+Y will be used, which is equal to or smaller than N.

Obviously, in all cases, if there are fewer determined resonances than the number of allocated filters, not all allocated filters will be used.

The selection of which determined resonances below $F_T$ in strategy (c) and which determined resonances above $F_T$ in strategies (a), (b) and (c) will be compensated, is determined by predefined criteria and can, for instance, be based on selecting the resonances with the largest amplitudes or can be based on selecting the resonances with the lowest frequencies. Many other predefined resonance selection criteria can be used and fall within the scope of protection defined by the claims.

It is understood that the above three filter allocation strategies should not be regarded as the only possible filter allocation strategies and that also other strategies will fall within the scope of protection defined by the claims.

The invention claimed is:

1. A method for improving a sound quality of a sound reproduction or recording in a room, the method comprising the steps of:
    measuring an impulse response that comprises a linear response of the room;
    performing a time domain analysis to determine resonances of the room;
    for a group of room resonances selected based on predefined criteria determining a corresponding group of filters that, when inserted in a sound reproduction or recording chain in said room will counteract an unwanted effect of said group of room resonances on the sound quality of the sound reproduction or recording made in the room;
    obtaining a measure of amplitude decay as a function of frequency of the measured impulse response by periodical cumulative decay spectrum (PCDS) analysis of the measured impulse response;
    determining the room resonances by performing a peak detection analysis or a determination of local maxima on the measure of amplitude decay as a function of frequency;
    choosing specific room resonances based on the predefined criteria, which room resonances are characterized by respective resonance frequencies $F_i$ that are to be compensated for in order to improve said sound quality;
    determining a bandwidth $Q_i$ and a gain $G_i$ of each of said room resonances; and
    based on the respective parameters $F_i$, $Q_i$ and $G_i$ determining a compensating signal processing means comprising a filter bank or an equalizer that when inserted into the sound reproduction or recording chain substantially counteracts the unwanted effect of the chosen specific room resonances on the sound quality,
    wherein there is defined a maximum number X of filters or pairs of filters to be used below $F_T$ and a maximum number Y of filters or pairs of filters to be used above $F_T$.

2. The method according to claim 1, wherein said impulse response further comprises a linear response of a transducer of a loudspeaker and/or a microphone used to measure the impulse response.

3. The method according to claim 1, wherein the step of obtaining the measure of amplitude decay as a function of frequency is started at a specified time after the start of the measured impulse response.

4. The method according to claim 1, wherein the step of obtaining the measure of amplitude decay as a function of frequency is started at multiple specified times after the start of the measured impulse response.

5. The method according to claim 1, wherein said compensating signal processing means comprises at least one dip filter and at least one boost filter, each characterized by a respective center frequency, bandwidth and gain, which center frequency, bandwidth and gain according to the method are adjusted based on said parameters $F_i$, $Q_i$ and $G_i$ determined at said chosen room resonances.

6. The method according to claim 5 further comprising the steps of:
    selecting, based on predefined parameters a transition frequency $F_T$;
    below $F_T$ using a first predetermined Q-value for each dip filter and a second predetermined Q-value for each boost filter;
    above $F_T$ using a third predetermined Q-value for each dip filter and a fourth predetermined Q-value for each boost filter.

7. The method according to claim 6, wherein one boost filter is used for each dip filter, where the bandwidth of each respective boost filter is wider than the bandwidth of the corresponding dip filter.

8. The method according to claim 7, wherein the gain of the respective boost filters is determined by multiplying a respective constant based on the Q-value of the associated dip filter, with the gain of the associated dip filter, where respective constants are predetermined such that the respective resulting boost filter approximately adds energy removed by the respective dip filter back into the signal processed by a combination of the dip and boost filters.

9. The method according to claim 5, wherein the gain of the respective dip filters is determined based on maximum values of a resulting difference curve in a small frequency area around the chosen room resonances and a set of two predetermined constants A and B, where constant A is used below said transition frequency $F_T$ and constant B is used above said transition frequency $F_T$, where the constants A and B depend on a loudspeaker to microphone setup.

10. The method according to claim 1, wherein the specific room resonances that shall be compensated by the method are chosen based on the determined gain $G_i$ of the determined room resonances, such that a number M of specific room resonances having the largest gain values are chosen.

11. The method according to claim 1, wherein said compensating signal processing means comprises a total number of N filters or corresponding pairs of filters, including corresponding dip and boost filters.

12. The method according to claim 1, wherein below the transition frequency $F_T$ all determined resonances are compensated and above $F_T$ as many of the determined resonances as possible are compensated by the remaining filters or pairs of filters.

13. The method according to claim 1, wherein below the transition frequency $F_T$ all determined resonances are compensated and above $F_T$ as many of the determined resonances as possible are compensated by the Y filters or pairs of filters.

14. The method according to claim 1, wherein below $F_T$ as many of the determined resonances as possible are compensated by the X filters or pairs of filters and above $F_T$ as many of the determined resonances as possible are compensated by the Y filters or pairs of filters.

15. A device for improving a sound quality of a sound reproduction or recording in a room, the device comprising filter means configured to implement the method according to claim 1, such that introduction of the device in a signal chain between an audio signal source and a loudspeaker or between a microphone and a sound recording device substantially compensates for an unwanted effect of resonances in the room on the sound quality of the sound reproduction or recording.

16. The device according to claim 15, where said filter means comprise one or more dip filters comprising parameters that are determined based on the determined resonances of the room.

17. The device according to claim 16, where said filter means comprise one or more boost filters configured to reduce an unwanted effect of said dip filters on the sound quality.

* * * * *

UNITED STATES PATENT AND TRADEMARK OFFICE
CERTIFICATE OF CORRECTION

| | | |
|---|---|---|
| PATENT NO. | : 12,328,554 B2 | Page 1 of 1 |
| APPLICATION NO. | : 17/936255 | |
| DATED | : June 10, 2025 | |
| INVENTOR(S) | : Lasse Zinck Thomasberg et al. | |

It is certified that error appears in the above-identified patent and that said Letters Patent is hereby corrected as shown below:

In the Specification

Column 4, Line 32, delete "(PODS)" and insert in its place --(PCDS)--.

Column 6, Lines 10 and 48, delete "PODS" and insert in its place --PCDS--.

Column 7, Line 44, delete "Pods" and insert in its place --PCDS--.

Column 7, Line 46, delete "(PODS)" and insert in its place --(PCDS)--.

Column 7, Line 61, delete "PODS" and insert in its place --PCDS--.

Column 8, Line 22, delete "PODS" and insert in its place --PCDS--.

Signed and Sealed this
Thirtieth Day of September, 2025

John A. Squires
*Director of the United States Patent and Trademark Office*